(12) United States Patent
Le Blaye

(10) Patent No.: US 6,173,919 B1
(45) Date of Patent: Jan. 16, 2001

(54) ATTACHMENT DEVICE FOR AN AIRCRAFT ENGINE

(75) Inventor: Sébastien Le Blaye, Villaudric (FR)

(73) Assignee: Aerospatiale Societe Nationale Industrielle, Paris (FR)

(*) Notice: Under 35 U.S.C. 154(b), the term of this patent shall be extended for 0 days.

(21) Appl. No.: 09/236,899

(22) Filed: Jan. 26, 1999

(51) Int. Cl.[7] .................................................. B64D 27/00
(52) U.S. Cl. .......................... 244/54; 248/554; 60/39.31
(58) Field of Search .............................. 244/54; 60/39.31; 248/554, 555, 556, 557

(56) References Cited

U.S. PATENT DOCUMENTS

| 4,634,081 | * | 1/1987 | Chee . |
| 5,238,206 | * | 8/1993 | Pachomoff . |
| 5,351,930 | * | 10/1994 | Gwinn et al. . |
| 5,620,154 |   | 4/1997 | Hey . |
| 5,649,417 |   | 7/1997 | Hey . |
| 5,860,623 | * | 1/1999 | Dunstan et al. . |
| 5,927,644 | * | 7/1999 | Ellis et al. . |
| 6,059,227 | * | 5/2000 | Le Blaye et al. . |

FOREIGN PATENT DOCUMENTS

| 0 527 672 | 2/1993 | (EP) . |
| WO 85/02596 | * 6/1985 | (WO) ................................ 60/39.31 |

* cited by examiner

Primary Examiner—Peter M. Poon
Assistant Examiner—Tien Dinh
(74) Attorney, Agent, or Firm—Burns Doane Swecker & Mathis, L.L.P.

(57) ABSTRACT

The invention relates to a device for attaching an aircraft engine onto a pylon fixed to a wing or a fuselage. The device comprises a fitting (26), fixed to the pylon (20) by bolts (34, 36), and at least two connecting arms (28, 30), linking the fitting to a structural component (22) of the engine. To allow the installation of engines with larger diameters while preserving the mechanical strength and without increasing aerodynamic disturbance, barrel nuts (38, 40) are put into position into which the bolts (34, 36) are screwed, and certain pins connecting the connecting arms (28, 30) to the fitting (26) are put into the same bores (42, 43) of the fitting.

9 Claims, 5 Drawing Sheets

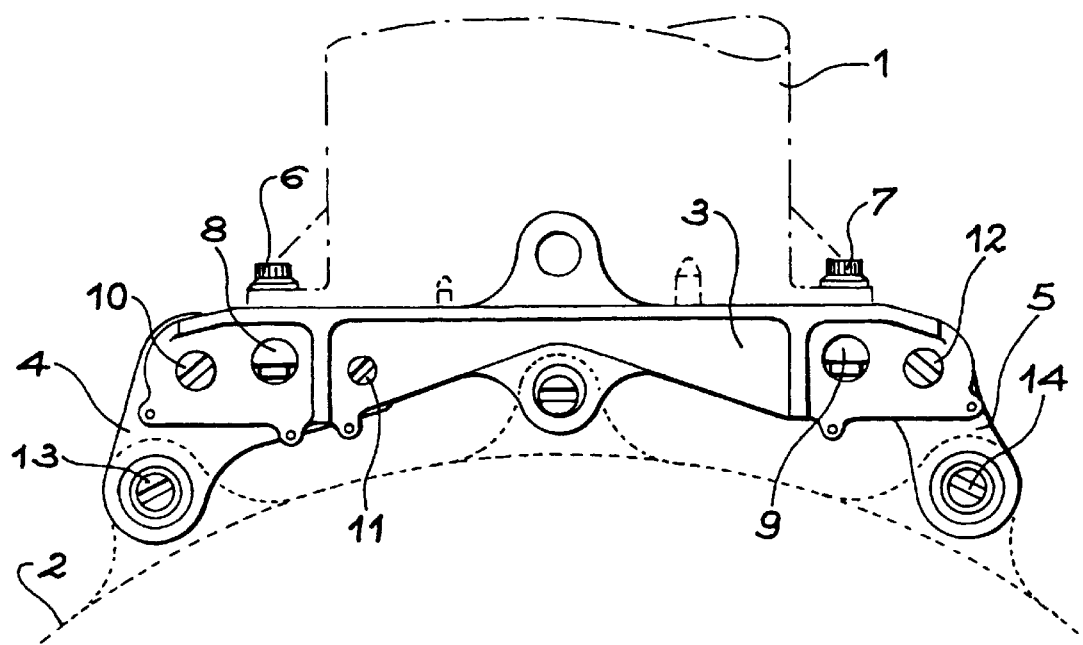
FIG._1
(PRIOR ART)
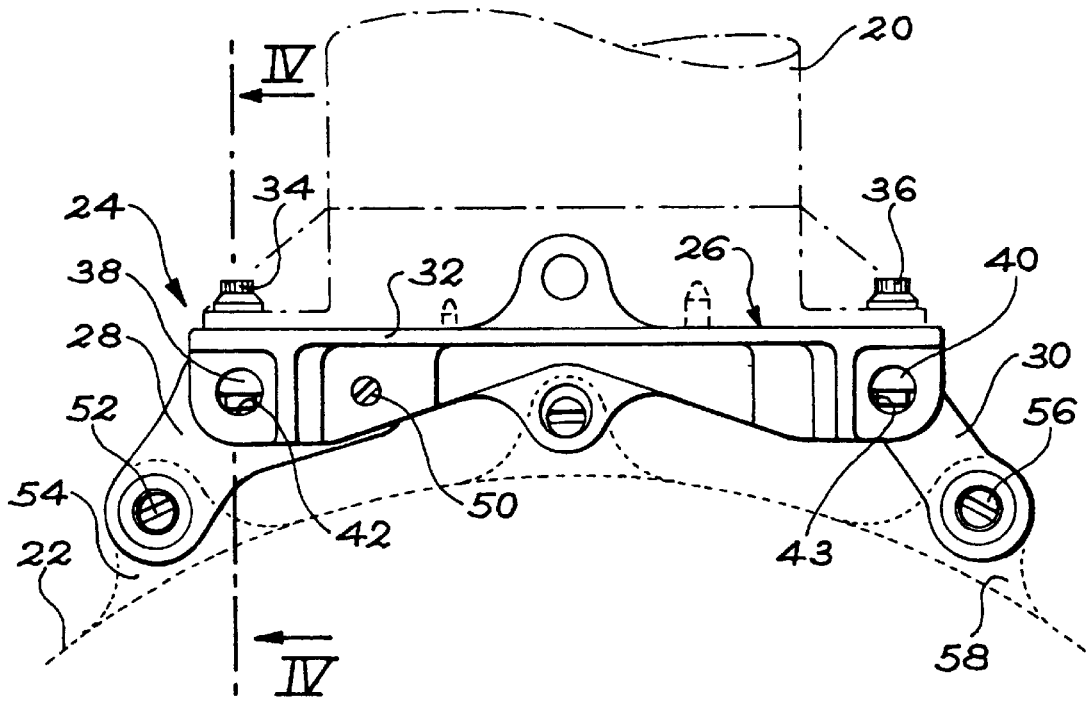
FIG._2

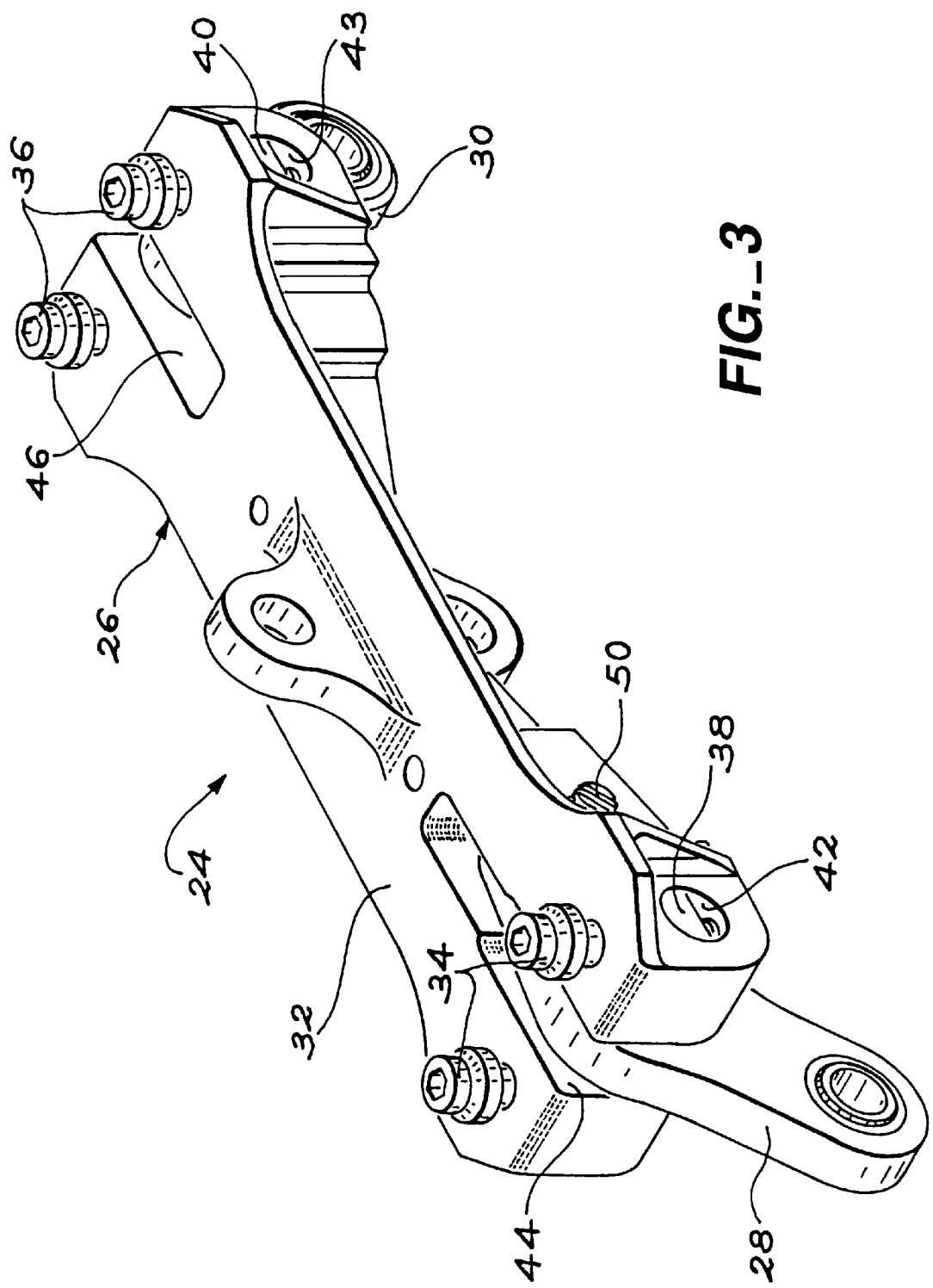
FIG._3

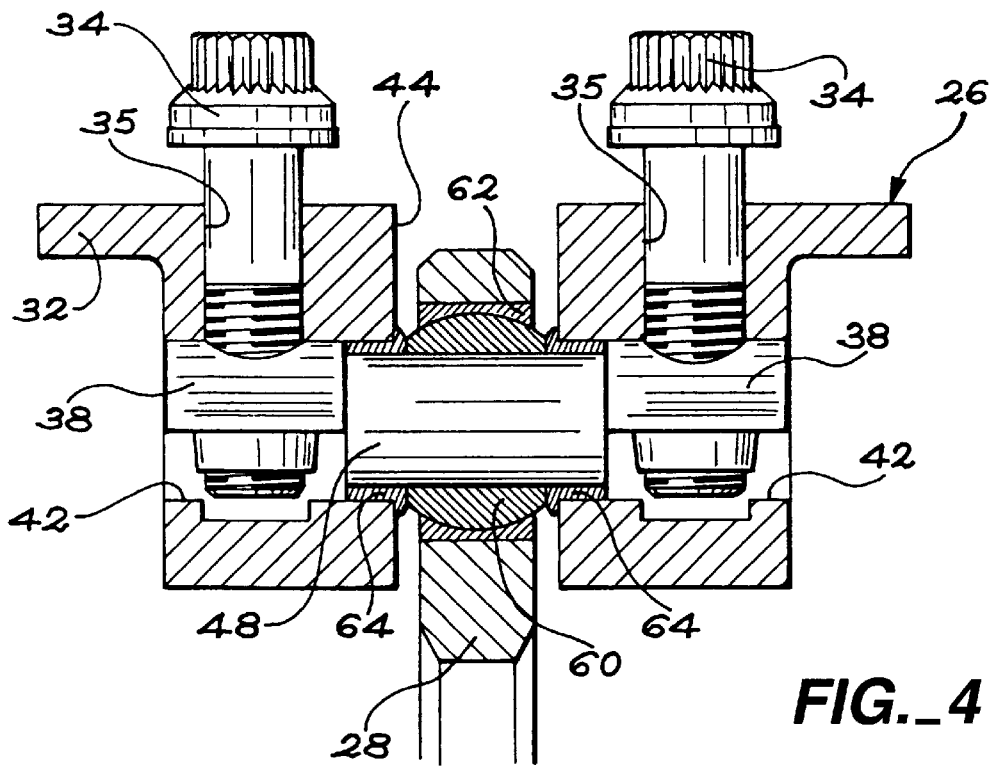
FIG._4
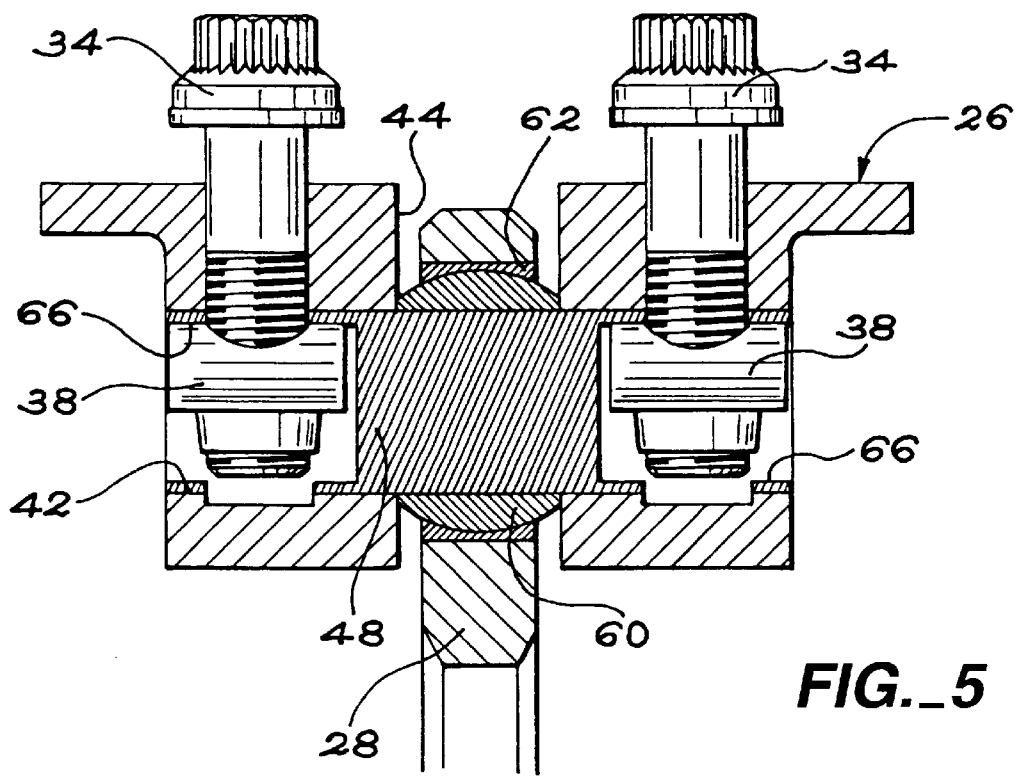
FIG._5

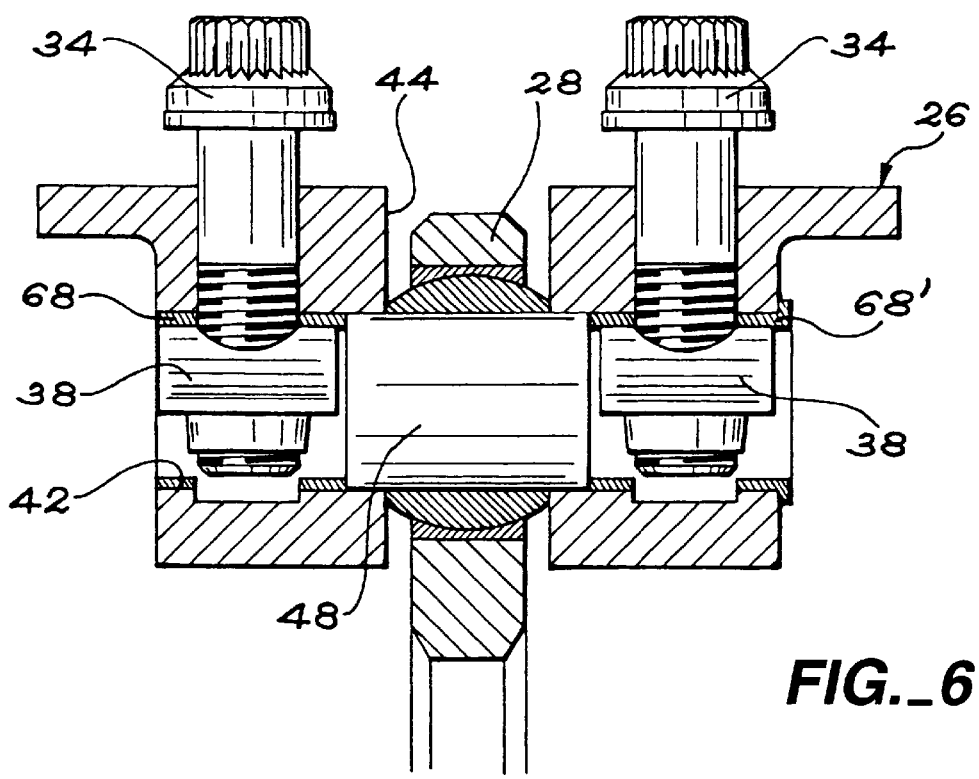
FIG._6
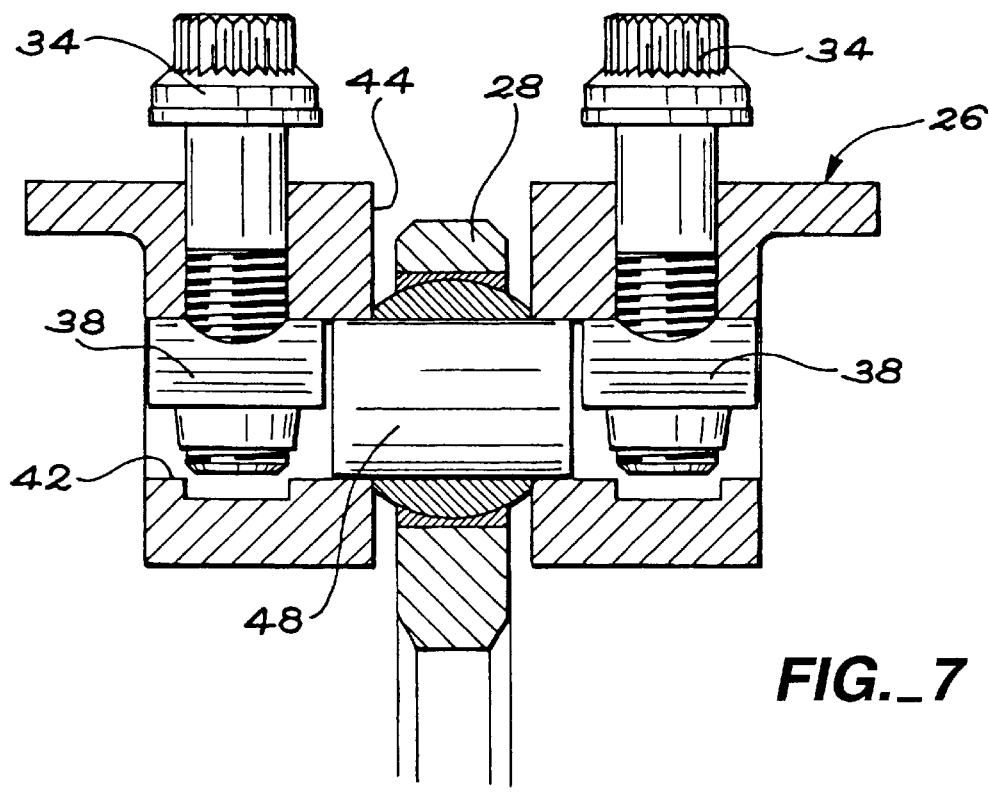
FIG._7

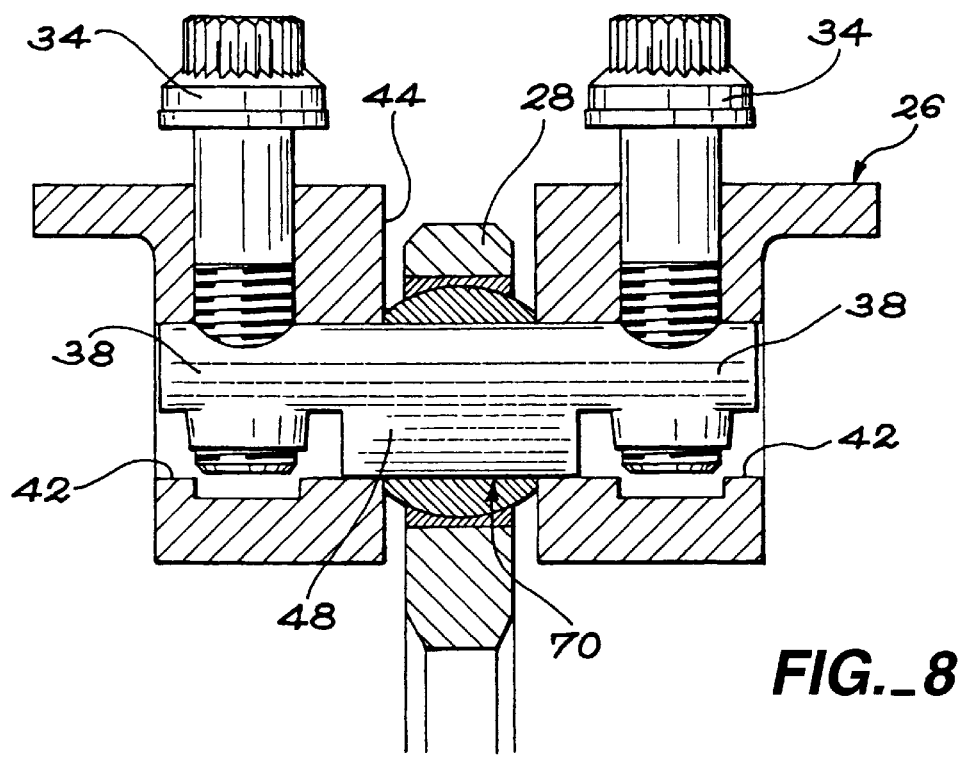
FIG._8
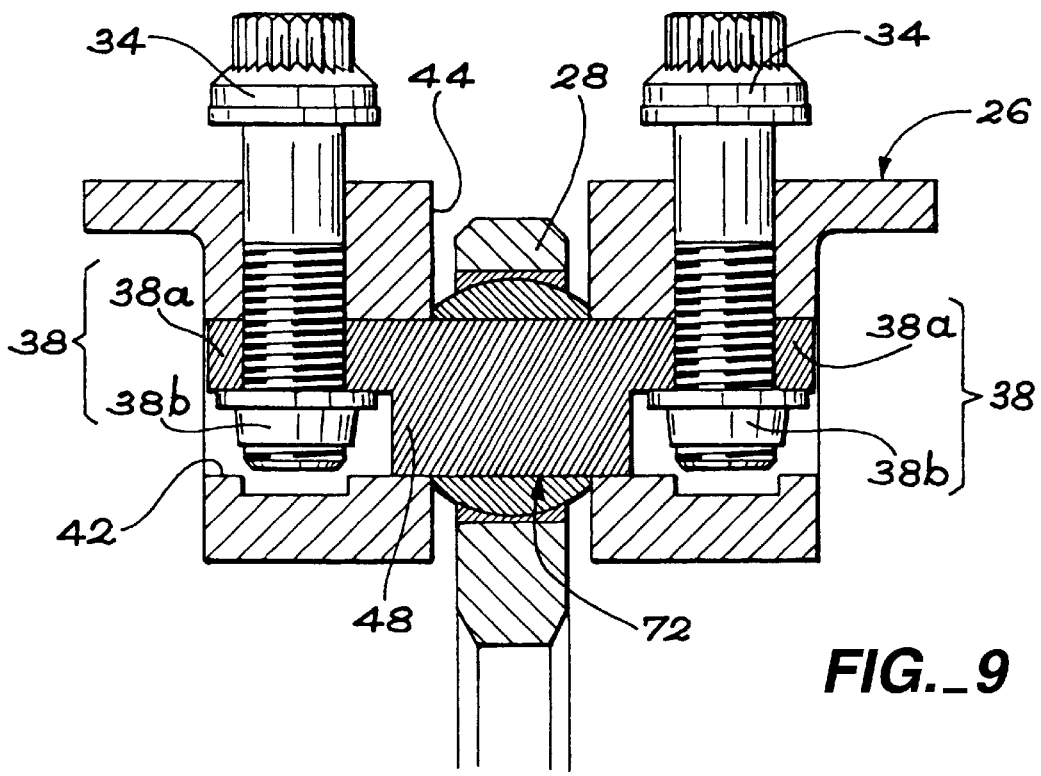
FIG._9

ATTACHMENT DEVICE FOR AN AIRCRAFT ENGINE

TECHNOLOGICAL FIELD

The invention relates to a device for attaching an aircraft engine onto a pylon fixed to an aircraft structure such as a wing or an element of the fuselage.

More precisely, the invention relates to an attachment device responsible for taking up, for example, lateral and vertical forces and/or the engine torque. Such an attachment device constitutes one of the elements of an attachment system through which the forces generated by the engine are transmitted to the aircraft through the pylon.

STATE OF THE TECHNOLOGY

In a known way, engines which are fitted to aircraft are suspended from or laterally attached to a pylon which is itself fixed respectively under the wing or onto the fuselage of the aircraft.

The attachment systems that link the engines to the pylon are generally constituted by at least two or three separate attachment devices. One of these devices is responsible, for example, for taking up the lateral and vertical forces generated by the engine, in order to transmit them to the aircraft through the pylon. More often than not, this attachment device also provides the transmission of the engine torque. However this transmission can also occur through a separate attachment device.

In a known and systematic manner, the attachment device that provides the taking up of the lateral and vertical forces, and more often than not, the engine torque, has a structure of the type illustrated in FIG. 1 of the appended drawings.

In this Figure, reference number 1 designates the pylon onto which the engine must be attached. The attachment device comprises essentially a fitting 3, and from two to four connecting arms (two connecting arms 4 and 5 are illustrated in FIG. 1). The fitting 3 is fixed onto the pylon 1 by two pairs of tensile bolts 6 and 7, screwed into barrel nuts 8 and 9, themselves housed in bores which pass through the fitting 3.

Furthermore, the connecting arms 4 and 5 provide the link between the fitting 3 and the engine 2. To this effect, each connecting arm is connected to the fitting 3 by one or two pins and to the engine 2 by one pin. Hence, in the case of FIG. 1, the connecting arm 4 is connected to the fitting 3 by two pins 10 and 11 situated on either side of the bore into which the barrel nuts 8 are received, while the connecting arm 5 is connected to the fitting 3 by a single pin 12, offset circumferentially towards the outside with respect to the bore within which the barrel nuts are received. The pins connecting respectively the connecting arms 4 and 5 to the engine 2 are designated by reference numbers 13 and 14.

Existing attachment devices produced in accordance with this principle are illustrated notably through documents U.S. Pat. No. 5,620,154 and U.S. Pat. No. 5,649,417.

The attachment devices of this type, which are fitted to practically all aeroplanes sold at the present time, do not allow one to resolve the problems generated by the recent appearance of new improved engines with higher performance.

The continuous research seeking an increase in thrust is leading to the appearance of engines with air intakes of larger and larger diameters. When the engines are attached under the wings of aircraft, it is desirable to be able to raise them so as to prevent them touching the ground.

With existing attachment devices of the type previously described making reference to FIG. 1, this requires the raising up of connecting arms 4 and 5, that is to say bringing them closer to the horizontal. Given that the fixing points of the connecting arms to the engine cannot be moved, this leads either to the hinge pins 10 and 12 coming closer to the bores within which the barrel nuts are received or contrary to this to an increase in the circumferential length of the fitting 3, so as to offset the hinge pins on the connecting arms towards the outside with respect to the hinge pins 13 and 14 of the connecting arms on the engine.

If the first solution is adopted, this would amount to reducing the existing spacing between the bores in which the barrel nuts 8 and 9 are received and the bores in which the hinge pins 10 and 12 are received. This solution cannot be considered in practice since it would lead to an intolerable reduction in the spacing between the bores. In effect, the reduction of this spacing would bring about a risk of fracture of the fitting that had become too thin in the relevant area.

The other solution, which consists of increasing the circumferential length of the fitting 3, is no longer applicable in practice, for aerodynamic reasons. In effect, the presence of the fitting 3 creates turbulence which disturbs the air-flow and brings about a loss of thrust. An increase in the circumferential length of the fitting therefore leads to an unacceptable increase in turbulence. On the contrary, it is desirable to reduce turbulence by reducing the distance between pins 10 and 12 through which the connecting arms 4 and 5 are articulated on the fitting 3.

Therefore, existing attachment devices in practice prevent the integration of engines of modern design having increased thrust.

DESCRIPTION OF THE INVENTION

The precise object of the invention is an attachment device for an aircraft engine, the original design of which allows one to envisage the integration of engines with greater thrust, without increasing aerodynamic disturbance created by the device and while preserving its mechanical strength properties.

According to the invention, this result is achieved by means of a device for attaching an engine onto a pylon fixed to an aircraft structure, that comprises an intermediate fitting capable of being fixed to the pylon by bolts screwed into barrel nuts housed in bores that pass through the fitting and at least two connecting arms hinged on the fitting by pins, in such a way as to connect the fitting to the engine, characterised by the fact that at least one of said pins is mounted in one of the bores housing the barrel nuts.

According to one preferred embodiment of the invention, two barrel nuts are housed respectively in two sections of each bore situated on either side of a groove which passes through one of the connecting arms, in such a way that said pin is mounted at least in parts of said sections that are adjacent the groove.

This preferred embodiment of the invention can take different forms, depending on the relative diameters of the barrel nuts and the pivot pins.

Thus, when the diameter of the pin is less than that of the barrel nuts and of the bore, the pin is mounted in the previously mentioned sections of the bore using two rings, that may have shoulders or may not. The two barrel nuts are then housed in each of the sections of the bore, beyond the ends of the pin.

When the two barrel nuts have a diameter less than that of the pin and of the bore, they can be received in housings machined in end portions of the pin, these end portions then being mounted in the previously mentioned sections of the bore.

When the two barrel nuts have a diameter less than that of the pin and of the bore, they can also be mounted in the previously mentioned sections of the bore, beyond the ends of the pin using two rings, that may have shoulders or may not.

In the case where the two barrel nuts have a diameter equal to that of the pin, they can be mounted directly in the previously mentioned sections of the bore beyond the ends of the pin.

In the same case, the two barrel nuts and the pin can also be produced as a single component of uniform diameter.

Finally still with the pin and the two barrel nuts having the same diameter, two nut carriers and the pin can be produced as a single component of uniform diameter, the floating nuts then being mounted in the nut carriers.

Whatever the embodiment of the invention, the intermediate fitting is in general capable of being fixed to the pylon by four bolts, screwed into four barrel nuts housed two by two in two bores passing through end regions of the fitting. Preferably, two hinge pins for the two connecting arms are then respectively received in the previously mentioned bores.

BRIEF DESCRIPTION OF THE DRAWINGS

Various embodiments of the invention will now be described by way of non-limitative examples, making reference to the appended drawings in which:

FIG. 1, already described, is a front elevation of a device for attaching an engine according to the prior art;

FIG. 2 is a front elevation, comparable to FIG. 1, illustrating a device for attaching an aeroplane engine conforming to the invention;

FIG. 3 is a perspective view of the device of FIG. 2;

FIG. 4 is a cross-section view along the line IV—IV of FIG. 2, illustrating a first embodiment of the invention;

FIG. 5 is a cross-section view, comparable to FIG. 4, illustrating a second embodiment of the invention;

FIG. 6 is a cross-section view, comparable to FIGS. 4 and 5, illustrating a third embodiment of the invention;

FIG. 7 is a cross-section view, comparable to FIGS. 4 to 6, illustrating a fourth embodiment of the invention;

FIG. 8 is a cross-section view, comparable to FIGS. 4 to 7, illustrating a fifth embodiment of the invention;

FIG. 9 is a cross-section view, comparable to FIGS. 4 to 8, illustrating a sixth embodiment of the invention;

DETAILED DESCRIPTION OF PREFERRED EMBODIMENTS OF THE INVENTION

In FIG. 2, reference number 20 designates a pylon provided, in order to be fixed, in a known way, to a structure of an aircraft, such as a wing or an element of the fuselage of the aircraft. More precisely, reference number 20 corresponds to the part of the pylon designed to take up the lateral and vertical forces, and more often than not, the torque, generated by an engine (not shown), so that these forces are transmitted to the aircraft through the pylon 20.

Furthermore, reference number 22 (FIG. 2) designates a component that forms an integral part of the non-rotating part of the engine and which is provided in order to be fixed onto this structure in accordance with known techniques, which do not form part of the invention. Only the part of the component 22 adjacent the pylon is illustrated, in broken lines, in FIG. 2. It should be noted that component 22, by which the engine is attached to the pylon 20, can be situated either to the front of or to the rear of the engine.

The connection between the pylon 20 and the component 22 is provided by an attachment device 24 conforming to the invention. It should be recalled that this attachment device 24 has the function of taking up the lateral and vertical forces and possibly also the engine torque, in order to transmit them to the structure of the aircraft through the pylon 20. All the other forces are transmitted by other attachment devices (not shown) which can be produced in accordance with other known techniques which do not form part of the invention.

The attachment device 24 conforming to the invention comprises an intermediate fitting 26, a lateral connecting arm with three pins and a simple lateral arm 30.

The intermediate fitting 26 comprises a sole plate 32, which has one flat face provided to be applied against a corresponding flat face of the pylon 20. When the engine is attached under the wing of the aircraft, the flat face of the pylon 20 is turned downward, as is illustrated by way of example in FIG. 2.

The fitting 26 is fixed to the pylon 20 by two pairs of tensile bolts 34 and 36, respectively screwed into two pairs of barrel nuts 38 and 40, embedded in the intermediate fitting 26. It may be recalled that a barrel nut is a nut which has an external cylindrical surface, the axis of which is perpendicular to the axis of the tapped hole which passes through it. A barrel nut can be produced depending on the case, in one or two pieces. In the second case, it comprises a floating nut mounted in a housing formed in a cylindrical nut carrier.

As is shown notably in FIG. 4, each pair of barrel nuts 38, 40 is housed respectively in a bore 42, 43 which passes through the fitting 26 parallel to the axis of the engine. Furthermore the bolts 34, 36 pass through aligned holes machined respectively in the pylon 20 and in the fitting 26, these holes emerging in the bores 42 and 43. The holes for the passage 35 of the bolts 34 appear in FIG. 4. The heads of the bolts 34 and 36 are applied against seats provided for this purpose on the pylon 20 in such a way as to apply the flat surfaces of the pylon and the fitting against one another when the bolts are screwed into the barrel nuts 38 and 40.

The intermediate fitting 26 extends substantially in a circumferential direction with respect to the axis of the engine. In this circumferential direction, each of the ends of the fitting is crossed by a groove 44, 46 which gives it the shape of a clevis. The grooves 44, 46 can totally cross the fitting 26, as illustrated in the Figures or only partially cross it.

The lateral connecting arm with three pins has approximately the shape of a V one of whose branches is received in the groove 44. The link between this branch of the connecting arm 28 and the fitting 26 is provided by two pins 48 (FIG. 4) and 50. These pins 48 and 50 pass through both the clevis formed in the fitting 26 by the groove 44 and the branch of the connecting arm 28 received in this groove, parallel to the axis of the engine.

According to the invention, one 48 of the two pins previously mentioned, and visible in FIG. 4, is received in the same bore 42 as the two barrel nuts 38 into which the bolts 34 are screwed. To put it another way, the pin 48 and the barrel nuts 38 are fitted co-axially. This fitting can take various forms which will be described later in more detail.

The second pin 50 which links the connecting arm 28 to the fitting 26 is offset towards the central part of the fitting with respect to pin 48, as is shown in FIGS. 2 and 3. This pin 50 is received in a bore which passes through both the end of the branch of the connecting arm 28 received in the groove 44 and the clevis formed in the fitting 26 by this groove.

In the usual way, the end of the other branch of the connecting arm 28 is linked to the component 22 by a third pin 52. More precisely, this third pin 52 is received in a bore which passes through both the connecting arm 28 and a clevis 54 (FIG. 2) which projects outwards from the peripheral edge of the component 22.

The link between the fitting 26 and the simple lateral connecting arm 30 is provided by a single pin (not shown). According to the invention, this pin is mounted in the same bore 43 as the barrel nuts 40 into which the bolts 36 are screwed. To put it another way, the pin previously mentioned and the barrel nuts 40 are arranged co-axially in the bore 43. The mounting for this pin can be created in various ways, like that of pin 48. The description that will be made later of the various possibilities for mounting the pin 48 are therefore also applicable to the pin linking connecting arm 30 to the fitting 26.

The link between the connecting arm 30 and the component 22 is provided by a second pin 56. This pin 56 is housed in a bore which passes through both the second end of the connecting arm and a clevis 58 which projects outwards from the peripheral edge of the component 22.

All of the pins, such as the pins 48, 50 52 and 56 which link the connecting arms 28 and 30 on the one hand to the fitting 26 and on the other hand to the component 22 are directed parallel to the axis of the engine. In addition, the mounting for each of these pins onto the corresponding connecting arm is provided by the use of a ball joint. Hence, in the case of the pin 48, FIG. 4 shows that this pin is received in a bore made in a ball joint 60. The ball joint 60 is, in its turn, received in a spherical housing machined in a component 62, itself mounted in a bore which passes through the connecting arm 28.

As has already been observed, mounting of the pin 48 and barrel nuts 38 in the bore 42 and the mounting of the pin (not shown) linking the connecting arm 30 to the fitting 26 and barrel nuts 40 in the bore 43 are carried out using identical fittings. Consequently, the description that will now be made, referring successively to FIGS. 4 to 9, in the case of the pin 48 and barrel nuts 38, is also applicable to the mounting of the pin linking the connecting arm 30 to the fitting 26 and the barrel nuts 40 in the bore 43.

As is illustrated, notably in FIG. 4, the two barrel nuts 38 are housed respectively in the two sections of the bore 42, formed in the fitting 26 on either side of the groove 44. The pin 48 is mounted between these two barrel nuts 38, in such a way as to traverse the groove 44 and to penetrate, at least in part, the previously mentioned sections of the bore 42, in the end portions of these sections, emerging into the groove 44.

In FIGS. 4 to 9, different ways of creating the joint mounting of the pin 48 and the barrel nuts 38 in the bore 42 are shown in a detailed way.

The embodiment shown in FIG. 4 relates to the case where the pin 48 has an external diameter less than that of the barrel nuts 38. In this case, the bore 42 is machined so that it is able to receive the barrel nuts 38. To put it another way, the bore 42 and the barrel nuts 38 have the same diameter.

The pin 48 therefore has a diameter less than that of the bore 42. Consequently, rings 64 are placed between the end portions of the pin 48 and the corresponding parts of the sections of the bore 42 in which these end portions are received.

In the embodiment illustrated in FIG. 4, the rings 64 include a portion with a shoulder placed between the ball joint 60 and the sides of the groove 44. In a variant of the embodiment that has not been shown, the rings 64 can also be simple rings, without any shoulder.

The embodiment of the invention illustrated in FIG. 5 relates to the case which is the reverse of that in FIG. 4, in which the external diameter of the pin 48 is greater than that of the barrel nuts 38. In this case, the diameter of the bore 42 is the same as that of the pin 48. As a consequence, the barrel nuts 38 have an external diameter less than that of the bore 42.

In the embodiment illustrated in FIG. 5, this difference in diameter is dealt with by using a pin 48 of greater length which traverses the groove 44 and extends substantially over the entire length of each of the two sections of the bore 42 situated on either side of this groove. In order to allow the barrel nuts 38 to be received, housings 66 are machined in the end portions of the pin 48, received in each of the sections of the bore 42. More precisely, these housings 66 are blind holes which are machined co-axially in the pin 48, with a diameter identical to the external diameter of the barrel nuts 38. The depth of these blind holes permits the barrel nuts 38 to be totally housed in them as is shown in FIG. 5.

FIG. 6 illustrates another embodiment of the invention, which relates to the same case as the embodiment in FIG. 5, in which the external diameter of the pin 48 is greater than that of the barrel nuts 38.

In the embodiment in FIG. 6, the pin 48 has a length comparable to that which it has in the embodiment in FIG. 4. In other words, pin 48 traverses the groove 44 and includes end portions which are received in parts of the sections of the bore 42 positioned between the groove 44 and the barrel nuts 38. Because the diameter of the pin 48 is equal to that of the bore 42, the end portions of the pin are in direct contact with the bore.

In order to deal with the fact that the barrel nuts 38 then have an external diameter less than that of the bore 42, rings 68 are placed between each of the barrel nuts 38 and the corresponding section of the bore 42, beyond the ends of the pin 48.

As has been shown on the left side of FIG. 6, the rings 68 can be simple rings, received totally in the corresponding section of the bore 42. As a variant, and as has been shown on the right side of FIG. 6, the rings 68' can also include a portion with a shoulder that presses on the external face of the fitting 26.

FIG. 7 represents another embodiment of the invention, applied to the case where the pin 48, the barrel nuts 38 and the bore 42 all have the same diameter.

In this embodiment in FIG. 7, the ways of mounting pin 48 and barrel nuts 38 are respectively the same as that for pin 48 in the embodiment in FIG. 6 and that for the barrel nuts 38 in the embodiment in FIG. 4. In other words, the pin 48 traverses the groove 44 and its ends directly penetrate the parts of the sections of the bore 42 adjacent the groove 44. In addition, the barrel nuts 38 are directly mounted in the remaining parts of the sections of the bore 42, beyond the ends of the pin 48.

The embodiment illustrated in FIG. 8 also relates to the case where the pin 48, the barrel nuts 38 and the bore 42 all have the same diameter.

In this embodiment in FIG. 8, the pin 48 and the barrel nuts 38 are produced as a single attachment in the form of a single component 70, of uniform diameter, which extends over the entire length of the bore 42, while traversing the groove 44. The pin 48 is then formed by the central portion of the component 70, the ends of which constitute the barrel nuts 38. This fitting allows the strength of the pin to be increased and reduces the number of components making up the assembly.

In FIG. 9, yet another embodiment is shown which relates to the case where the pin 48, the barrel nuts 38 and the bore have the same diameter.

In this embodiment, which constitutes a variant of the preceding one, the barrel nuts 38 are produced in two parts including a cylindrical carrier 38a and a floating nut 38b. The pin 48 and the carriers 38a for the barrel nuts 38 are produced as a single component 72, of uniform diameter, received directly in the bore 42 and extending over substantially the entire length of this bore traversing the groove 44. This embodiment, like the preceding one, allows the strength of the pin 48 to be increased. In addition, it has the advantage of facilitating the assembly of the bolts 34 thanks to the floating nature of the nuts 38b. The production of the assembly is improved.

Whichever embodiment is considered, is should be noted that a device that opposes rotation of the pin 48 in the bore 42 can be provided, making use of techniques known to men skilled in the art.

The fitting that has just been described making reference to FIGS. 2 to 9 allows one to give to the fitting 26, to the connecting arms, such as 28 and 30, which link it to the engine, minimum dimensions in the circumferential direction and in the radial direction with respect to the axis of the engine. The particularly compact fitting that is thereby obtained allows one to fit the new generation of engines with increased thrust, without increasing the disturbance to airflow and possibly even reducing them, this bringing with it a further increase in thrust.

In addition, the attachment device according to the invention is lighter than equivalent devices produced according to the previous technology, because of the reduction in size of the fitting.

It should be noted that the invention may be applied equally to attachment devices with two to four connecting arms, the link between the extra connecting arms and the fitting then being made in a conventional way.

What is claimed is:

1. A device for attaching an engine onto a pylon fixed to an aircraft structure, comprising an intermediate fitting capable of being fixed to the pylon by bolts screwed into barrel nuts housed in bores passing through the fitting, and at least two connecting arms articulated on the fitting by pins, in a way that links the fitting to the engine, in which at least one of said pins is mounted in one of the bores housing the nuts.

2. A device according to claim 1, in which two nuts are housed respectively in two sections of each bore, situated on either side of a groove which crosses one of the connecting arms, in such a way that said at least one of said pins is mounted at least in parts of said section adjacent the groove.

3. A device according to claim 2, in which said at least one of said pins has a diameter less than that of said one of the bores and is mounted in said sections of said one of the bores using two rings, the two barrel nuts being housed in each of the sections of the bore, beyond the ends of the at least one of said pins.

4. A device according to claim 2, in which the two barrel nuts have a diameter less than that of said one of the bores and are received in housings machined in end portions of said at least one of said pins pin mounted in said sections said one of the bores.

5. A device according to claim 2, in which the two barrel nuts have a diameter less than that of said one of the bores and are mounted in said sections of said one of the bores, beyond the ends of said at least one of said pins pin, using two rings.

6. A device according to claim 2, in which the two barrel nuts have a diameter equal to that of said at least one of said pins and are mounted in said sections of said one of the bores, beyond the ends of the at least one of said pins.

7. A device according to claim 2, in which the two barrel nuts and said at least one of said pins are produced as a single component of uniform diameter.

8. A device according to claim 2, in which two nut carriers and said at least one of said pins are produced as a single component of uniform diameter, floating nuts being mounted in the nut carriers.

9. A device according to claim 1, in which the intermediate fitting is capable of being fixed to the pylon by four bolts, screwed into four nuts housed two by two in two bores passing through end regions of the fitting, two pins for the articulation of two connecting arms being received respectively in said bores.

* * * * *